United States Patent
Such et al.

(10) Patent No.: US 8,389,645 B2
(45) Date of Patent: Mar. 5, 2013

(54) INITIATING SYSTEM FOR SOLID POLYESTER GRANULE MANUFACTURE

(75) Inventors: Christopher Henry Such, Mount Eliza (AU); Barbara Aurelia Czapski, Keysborough (AU); Karen Lai-On Seligman, Brunswick West (AU); Deepak Ajinkya, Glen Waverley (AU); Algirdas Kazimieras Serelis, Mount Waverley (AU)

(73) Assignee: Duluxgroup (Australia) Pty Ltd., Clayton (AU)

( * ) Notice: Subject to any disclaimer, the term of this patent is extended or adjusted under 35 U.S.C. 154(b) by 743 days.

(21) Appl. No.: 10/587,653

(22) PCT Filed: Jan. 27, 2005

(86) PCT No.: PCT/AU2005/000095
§ 371 (c)(1),
(2), (4) Date: Dec. 8, 2008

(87) PCT Pub. No.: WO2005/073257
PCT Pub. Date: Aug. 11, 2005

(65) Prior Publication Data
US 2009/0156734 A1    Jun. 18, 2009

(30) Foreign Application Priority Data
Jan. 30, 2004  (AU) ................. 2004900446

(51) Int. Cl.
*C08F 283/00*    (2006.01)
*C08F 4/32*    (2006.01)

(52) U.S. Cl. .......... 525/418; 525/43; 525/445; 526/232; 526/232.1

(58) Field of Classification Search ................ 525/418, 525/43, 445; 526/232, 232.1
See application file for complete search history.

(56) References Cited

U.S. PATENT DOCUMENTS

| | | | |
|---|---|---|---|
| 3,095,400 A | 6/1963 | Martino et al. | |
| 3,932,372 A | 1/1976 | Lewis et al. | |
| 4,129,703 A * | 12/1978 | Kamath et al. | 526/73 |
| 4,321,332 A | 3/1982 | Beresford et al. | |
| 4,399,237 A | 8/1983 | Morrison, Jr. | |
| 4,814,207 A | 3/1989 | Siol et al. | |
| 4,873,274 A | 10/1989 | Cummings et al. | |
| 5,056,996 A | 10/1991 | Papastavros et al. | |
| 6,533,967 B1 | 3/2003 | Ritchie et al. | |

FOREIGN PATENT DOCUMENTS

| | | |
|---|---|---|
| EP | 0 307 139 B1 | 3/1989 |
| GB | 937703 | 9/1963 |
| GB | 1491011 A | 11/1977 |
| WO | WO-97/35916 A1 | 10/1997 |

* cited by examiner

Primary Examiner — Ling Choi
Assistant Examiner — Gennadiy Mesh
(74) Attorney, Agent, or Firm — Birch, Stewart, Kolasch & Birch, LLP

(57) ABSTRACT

The invention relates to solid polyester granules of the type used as matting agents in paints. In particular, the invention relates to a new redox initiating system for use in a suspension polymerization process that is used to manufacture the solid polyester granules, to a process for the preparation of the solid polyester granules, and to paint compositions containing the solid polyester granules.

11 Claims, No Drawings

INITIATING SYSTEM FOR SOLID POLYESTER GRANULE MANUFACTURE

FIELD OF THE INVENTION

This invention relates generally to solid polyester granules of the type used as matting agents in paints. In particular, the invention relates to a new redox initiating system for use in a suspension polymerisation process used to manufacture these solid polyester granules, to a process for the preparation of the solid polyester granules, and to paint compositions comprising solid polyester granules.

BACKGROUND OF THE INVENTION

Solid polyester granules or beads are used as matting agents in paints, especially flat paints, to provide increased mar and burnish resistance. When included in flat paints, they provide outstanding resistance to wet and dry abrasion. The granules are generally added to paint formulations in the form of a dispersion in a continuous aqueous phase. In some cases the polymer granules contain a pigment, such as titanium dioxide, and in other cases they are unpigmented.

In the formulation of conventional flat decorative paints, the largest of the granules are approximately the thickness in diameter of the paint film. They protrude through the surface of the film and act as stationary ball bearings. Clothing, cleaning cloths and other objects that would normally mar the film only come into contact with the granules, and hence the paint film is very burnish resistant. This is in marked contrast to conventional flat paint films, where abrasion produces a large and unsightly localised increase in gloss.

Such solid polyester granules are commonly manufactured by the copolymerisation of an unsaturated polyester and styrene in a suspension polymerisation process. For example, solid polyester granules are often produced by first emulsifying in water a solution of unsaturated polyester in styrene which contains low levels of benzoyl peroxide and azobis (isobutyronitrile). Emulsification is achieved through use of colloid stabilisers and shear stirring the solution until a desired droplet size has been obtained. When this has been achieved, a low level of N,N-diethylaniline is typically added to the reaction solution to complete the redox couple (with benzoyl peroxide) and initiate the polymerisation reaction. The azobis(isobutyronitrile) thermal initiator assists in the latter part of the exotherm to increase conversion, but has been found to be not particularly effective at this. The reaction may or may not be stirred during this stage, but stirring has traditionally been maintained to prevent any risk of settlement of the newly formed granules.

Although solid polyester granules have been manufactured by such processes for many years, in more recent times, significant occupational health and safety issues in respect of these manufacturing techniques have become apparent. In particular:

(a) N,N-diethylaniline which is toxic and odorous. N,N-diethylaniline (DEA, CAS no. 91-66-7) is a liquid which can be absorbed through the skin resulting in surface irritation as well as causing methaemoglobinaemia with resulting anoxia and central nervous system depression. More significantly, these latter effects may arise if vapours are inhaled in significant amount ($LC_{50}$ rat=1920 $mg/m^3/4$ h). These hazards are significant in the case of DEA as it is a liquid. It is classified as a harmful/dangerous substance (class 6.1) under the Australian Code for the Transport of Dangerous Goods by Road and Rail.

(b) Azobis(isobutyronitrile) (AIBN) cannot be transported at temperatures above 25° C. by law, it cakes on storage and produces a toxic by-product (tetramethylsuccinonitrile CAS No. 3333-52-6) which persists in the granules.

(c) The levels of free styrene are higher than acceptable (1500 ppm or 0.15 wt % for clear solid granules, and 3000 ppm or 0.30 wt % for pigmented solid granules) by today's standards due to poor conversion of monomer into polymer.

The aforementioned problems, and in particular the residual monomer content, generally become more of a concern when the size of the polyester granules increases.

Recently, WO 00/43425 disclosed a less odorous/toxic initiating system for the production of solid polyester granules. The initiating system disclosed comprised a combination of a hydroxyl containing aromatic amine and a diacyl peroxide. Through use of this initiating system, it was reported that the handling of relatively toxic initiating species could be avoided or at least minimised, and the odour of unreacted monomer and the toxicity of the resultant granule slurry could be reduced.

Although there are some advantages afforded by the initiating system disclosed in WO 00/43425, the residual unreacted monomer content in the granule slurry produced using this initiating system falls well short of the residual monomer levels typically achieved in the manufacture of other polymeric paint constituents such as latex polymer binders. For example, the lowest residual free styrene level in the granule slurry produced in accordance with WO 00/43425 was about 1400 ppm, whereas levels well below 50 ppm can be obtained in the manufacture of latices in which a comparable amount of styrene is polymerised.

Accordingly, there remains an opportunity to develop an initiating system that can be used in a process for manufacturing both large and small solid polyester granules that enables the granules to be produced with relatively low levels of unreacted monomer.

SUMMARY OF THE INVENTION

The present invention provides the use of a combination of diacyl peroxides with an aromatic amine of formula (I):

(I)

where $R^1$ is an optionally substituted $C_1$-$C_{20}$ alkyl group, or (CHR'CHR'—O)$_n$H, where n is 1 to 10 and each R' is independently selected from H and $C_1$-$C_3$ alkyl;

$R^2$ is an optionally substituted $C_1$-$C_{20}$ alkyl group, or —(CHR'CHR'—O)$_n$H, where n is 1 to 10 and each R' is independently selected from H and $C_1$-$C_3$ alkyl; and Ar is an optionally substituted aryl group, as a redox initiating system in a process for the manufacture of solid polyester granules by suspension polymerisation, wherein the combination of diacyl peroxides comprises diaroyl peroxide and dialkanoyl peroxide having a diaroyl peroxide to dialkanoyl peroxide mole ratio that is equal to or greater than 1:1.

Preferably, one or both of $R^1$ and $R^2$ are $C_1$-$C_{20}$ alkyl substituted with one or more hydroxy groups.

The present invention also provides a process for the preparation of solid polyester granules comprising:

(i) preparing a solution of unsaturated polyester and a combination of diacyl peroxides in styrene, wherein the combination of diacyl peroxides comprises diaroyl peroxide and dialkanoyl peroxide having a diaroyl peroxide to dialkanoyl peroxide mole ratio that is equal to or greater than 1:1, (ii) emulsifying said solution in water to provide a stabilised oil-in-water emulsion, (ii) adding to said emulsion an aromatic amine of formula (I):

(I)

where $R^1$ is an optionally substituted $C_1$-$C_{20}$ alkyl group, or —(CHR'CHR'—O)$_n$H, where n is 1 to 10 and each $R^1$ is independently selected from H and $C_1$-$C_3$ alkyl;

$R^2$ is an optionally substituted $C_1$-$C_{20}$ alkyl group, or —(CHR'CHR'—O)$_n$H, where n is 1 to 10 and each R' is independently selected from H and $C_1$-$C_3$ alkyl; and Ar is an optionally substituted aryl group, such that reaction of said aromatic amine of formula (I) with each of the diaroyl and dialkanoyl peroxides generates a radical flux capable of initiating polymerisation of the unsaturated polyester and the styrene.

Preferably, one or both of $R^1$ and $R^2$ are $C_1$-$C_{20}$ alkyl substituted with one or more hydroxy groups.

Surprisingly, it has now been found that a highly efficient redox initiating system for the manufacture of solid polyester granules can be formed by providing a combination of diacyl peroxides in a particular mole ratio with an amine of formula (I). In particular, through use of the initiating system in accordance with the invention, polyester granules can now be prepared by suspension polymerisation such that the resultant granule slurry has a residual free styrene level of less than 1000 ppm, and potentially less than 100 ppm.

DETAILED DESCRIPTION OF THE INVENTION

In accordance with the invention, the combination of diacyl peroxides comprises a diaroyl peroxide. Examples of suitable diaroyl peroxides include those selected from compounds of formula (II):

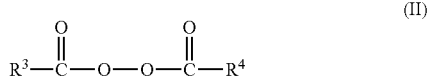

(II)

where $R^3$ and $R^4$ are independently selected from optionally substituted aryl.

Preferably, $R^3$ and $R^4$ are independently selected from optionally substituted $C_6$-$C_{12}$ aryl.

In accordance with the invention, the combination of diacyl peroxides comprises a dialkanoyl peroxide. Examples of suitable dialkanoyl peroxides include those selected from compounds of formula (III):

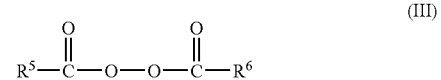

(III)

where $R^5$ and $R^6$ are independently selected from optionally substituted alkyl.

Preferably, $R^5$ and $R^6$ are independently selected from optionally substituted $C_1$-$C_{20}$ alkyl.

It will appreciated that numerous diaroyl and dialkanoyl peroxides are known. As would be expected, some combinations of particular diaroyl and dialkanoyl peroxides may perform better than others when used in accordance with the invention. Those skilled in the art should be able to readily conduct empirical experiments in order to evaluate the suitability of combinations of particular diaroyl and dialkanoyl peroxides.

Examples of suitable commercially available peroxides of formula (II) include, but are not limited to, dibenzoyl peroxide and 2,4-dichlorobenzoyl peroxide.

Examples of suitable commercially available peroxides of formula (D) include, but are not limited to, dilauroyl peroxide, diacetyl peroxide, disuccinyl peroxide, di(3,5,5-trimethylhexanoyl) peroxide, and didecanoyl peroxide.

An important feature of the present invention is that the combination of diacyl peroxides is used in a particular mole ratio. By ensuring that the number of moles of the diaroyl peroxide is equal to or greater than the number of moles of the dialkanoyl peroxide, the initiating system can become surprisingly highly efficient. In particular, the initiating system can provide for a high conversion of monomer into polymer such that the residual free styrene level in the resultant granule slurry is exceptionally low.

Preferably, the combination of diacyl peroxides are selected and provided in a mole ratio to afford a granule slurry that comprises a residual free styrene content of less than 1000 ppm, more preferably of less than 600 ppm, most preferably of less than 250 ppm. In a particularly preferred embodiment of the invention, the combination of peroxides is provided in a mole ratio to afford a granule slurry that comprises a residual free styrene content of less than 100 ppm.

Preferably, the mole ratio of the diaroyl peroxide to the dialkanoyl peroxide ranges from 1:1 to 10:1, more preferably from 1:1 to 5:1, most preferably from 1:1 to 3:1.

Those skilled in the art will appreciate that as a redox initiating system, the aromatic amine compound of formula (I) reacts with the diacyl peroxides to provide a radical flux that can initiate the polymerisation. Although the advantages of using the combination of peroxides in the aforementioned mole ratios can be obtained with any appropriate amount of the aromatic amine compound, it is preferred that the mole ratio of the aromatic amine compound to the total number of moles of the diaroyl and dialkanoyl peroxides range from 1:2 to 1:8, more preferably from 1:2 to 1:6, most preferably from 1:2 to 1:4.

In the aromatic amine compound of formula (I), preferably one or both of $R^1$ and $R^2$, more preferably both, are linear $C_1$-$C_6$ alkyl groups having terminal hydroxy substituents. More preferably one or both of $R^1$ and $R^2$, still more preferably both, are hydroxyethyl groups. Preferably when $R^1$ or $R^2$ is —(CHR'CHR'O)$_n$H at least one R' on each —(CHR'CHR'—O)— unit is hydrogen. More preferably both R' on each unit is hydrogen.

Preferably the aryl group (Ar) of formula (I) is an optionally substituted phenyl group. The optional substituents are preferably selected from electron donating groups. Examples of suitable electron donating groups include phenyl, $C_1$-$C_6$ alkyl, or $C_1$-$C_6$ alkoxy. Preferably the phenyl group is substituted in the meta or para positions. The presence of electron withdrawing groups is believed to interfere with the reactivity of the amine, and accordingly they are not preferred.

A combination of aromatic amine compounds of formula (I) may be used in accordance with the invention.

Suitable aromatic amines of formula (I) include, but are not limited to, (N-ethyl-N-hydroxyethyl aniline, N,N-bis hydroxyethyl aniline, N-ethyl-N-hydroxyethyl-p-toluidine and N,N-bis 2-hydroxyethyl)-p-toluidine, N,N-Dimethylaniline, N,N-diethylaniline, N,N-dibutylaniline, N-methyl-N-ethylaniline, N,N-dimethyl-p-toluidine, N,N-dimethyl-m-toluidine, N,N-dimethyl-m-chloroaniline, N,N-dimethyl-p-chloroaniline, N,N-dimethyl-m-methoxyaniline and N,N-dimethyl-p-methoxyaniline.

The term "alkyl", used herein denotes straight chain, branched or cyclic alkyl, preferably $C_{1-20}$ alkyl or cycloalkyl. Examples of straight chain and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2,-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3,-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butyl-heptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like.

The term "alkoxy" denotes straight chain or branched alkoxy, preferably $C_{1-6}$ alkoxy. Examples of alkoxy include methoxy, ethoxy, n-propoxy, isopropoxy and the different butoxy isomers.

The term "aryl" as used herein refers to any moiety which includes or consists of one or more aromatic or pseudoaromatic rings. The rings may be carbocyclic or heterocyclic, and may be mono or polycyclic ring systems. Examples of suitable rings include but are not limited to benzene, biphenyl, terphenyl, quaterphenyl, naphthalene, anthracene, benzanthracene, dibenzanthracene, phenanthracene, perylene, pyridine, 4-phenylpyridine, 3-phenylpyridine, thiophene, benzothiophene, naphthothiophene, thianthrene, furan, pyrene, isobenzofuran, chromene, phenoxathiin, pyrrole, imidazole, pyrazole, pyrazine, pyrimidine, pyridazine, indole, indolizine, isoindole, purine, quinoline, isoquinoline, phthalazine, quinoxaline, quinazoline, pteridine, carbazole, carboline, phenanthridine, acridine, phenanthroline, phenazine, isothiazole, isooxazole, phenoxazine and the like, each of which may be optionally substituted. The terms "aromatic" and "aromatic compound(s)" include molecules, and macromolecules, such as polymers, copolymers and dendrimers which include or consist of one or more aromatic or pseudoaromatic rings. The term "pseudoaromatic" refers to a ring system which is not strictly aromatic, but which is stabilized by means of delocalization of π electrons and behaves in a similar manner to aromatic rings. Examples of pseudoaromatic rings include but are not limited to furan, thiophene, pyrrole and the like.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, isocyano, cyano, formyl, carboxyl, amino, alkylamino, dialkylamino, alkenylamino, alkynylamino, arylamino, diarylamino, benzylamino, imino, alkylimine, alkenylimine, alkynylimino, arylimino, benzylimino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphenyl, arylsulphenyl, carboalkoxy, carboaryloxy, alkylthio, benzylthio, acylthio, sulphonamido, sulfanyl, sulfo and phosphorus-containing groups, alkoxysilyl, silyl, alkylsilyl, alkylalkoxysilyl, phenoxysilyl, alkylphenoxysilyl, alkoxyphenoxy silyl and arylphenoxy silyl. Optional substituents should be non deleterious to the extent that they do not interfere with the emulsion polymerisation process.

Several aromatic amines that may be used in accordance with the present invention are available from commercial sources. For example N,N-bis(2-hydroxyethyl)-p-toluidine (HET) is available from Morin Chemicals (Japan). The dihydroxyamine, m-chlorophenyldiethanolamine (Cas no. 92-00-2) is a low melting point solid (mp=84° C.) and as such may be a safer option than the use of DEA. This compound is also available from Morin Chemicals (Japan).

Those aromatic amines suitable for use in accordance with the invention that are not available from commercial sources can be prepared using analogous methods to those described in the literature for preparing the commercially available products. Those skilled in the art should be readily able to adapt the literature synthetic procedures. Amines having polyoxyalkylene substituents on the nitrogen can be prepared by alkoxylating the corresponding hydroxyalkyl compound with an appropriate alkylene oxide.

The first step in the process of the invention involves the preparation of a solution of unsaturated polyester and the combination of diacyl peroxides in styrene. The unsaturated polyester may be any suitable commercially available unsaturated polyester, such as Polylite 31-001 (Reichnold Chemicals, USA), or the unsaturated polyester may be prepared using conventional techniques. Unsaturated polyesters can be broadly described as the reaction products of difunctional carboxylic acids and alcohols which contain double bonds within the polymer backbone. The double bonds may be derived from the alcohol component or from the carboxylic acid component. The unsaturated polyesters useful according to the present invention are generally terpolymers of the following three components:

(i) unsaturated aliphatic polycarboxylic acid/anhydride, such as fumaric acid, maleic acid anhydride or the like,
(ii) aromatic polycarboxylic acid such as phthalic anhydride, isophthalic acid or the like, and
(iii) polyol, such as propylene glycol, neopentyl glycol or the like.

These components are reacted to form essentially a linear unsaturated polyester chain via a condensation polymerisation process. Since the final step in utilising a polyester in many applications (typically the curing step) involves an addition or chain polymerisation reaction with styrene, many commercial suppliers of unsaturated polyesters provide it in the form of a solution in styrene. Preferably the unsaturated polyester is a terpolymer of maleic anhydride, phthalic anhydride and propylene glycol.

The solution of unsaturated polyester and the combination of diacyl peroxides in styrene may be prepared in a number of ways. The combination of diacyl peroxides may be added directly to a prepared solution of unsaturated polyester in styrene, or it may be pre-dissolved in styrene, with warming and/or mixing if necessary before being added to the unsaturated polyester solution. Further styrene may be added to give the desired concentration.

The polyester granules may be coloured, for example through incorporation of a pigment material. There are no particular limitations on the type of pigment that may be used provided that it can be dispersed in the solution that is polymerised to from the granules. For example, a pigment, such as $TiO_2$, may be dispersed by high speed agitation in styrene or a styrene/polyester blend. This dispersion can then be diluted with further styrene or styrene/polyester blend. The combination of diacyl peroxides may be separately dissolved in styrene as described above before being combined with the mixture of polyester, styrene and pigment.

Other additives conventional to the art may also be added to the organic solution. For example AIBN may also be added. In the case of AIBN, this is conveniently added with the combination of diacyl peroxides to styrene or a styrene/polyester mix and stirred to form a solution.

Other additives could include a surfactant, e.g. sodium dihexylsulphosuccinate. Care needs to be exercised in adjusting or minimising the use of surfactant if granules above 100 μm in size are to be produced. If excessive surfactant is used, some may distribute to the aqueous phase and influence granule formation to the extent that it will be very difficult to maintain large polyester/styrene droplets. In particular, the smaller more mobile surfactants typically used to disperse pigments can be more of a problem compared with the large polymeric colloidal surfactants typically used to stabilise the emulsion during polymerisation. Under these circumstances, the polyester/styrene droplets can break-up to form smaller droplets and result in the formation of much smaller granules than desired. Hence large pigmented granules will generally require careful control of the ratio of surfactants to polyester/styrene.

The solution of unsaturated polyester and the combination of diacyl peroxides in styrene will generally have the following composition:

| Component | wt. % |
| --- | --- |
| Styrene | 5-40 |
| Unsaturated polyester* | 40-95 |
| Diacyl peroxide combination | ** |
| $TiO_2$ | 0-45 |
| Other additives | 0-2 |

*65% non-volatiles (NV) in styrene
** The remaining wt. % (ie. to add up to 100 wt. %) of the composition can be made up from a combination of diaroyl and dialkanoyl peroxides having a diaroyl peroxide to dialkanoyl peroxide mole ratio that is equal to or greater than 1:1.

The next step in the process is the preparation of an oil-in-water emulsion. The emulsion may be prepared by adding the above organic solution to an aqueous solution containing suitable stabilisers and/or surfactants. Again, if large granules are required then the choice of surfactant can be important. Conventional colloid stabilisers such as cellulosics or polyvinyl alcohol (PVA) that are well known to those skilled in the art have generally been found to work quite well.

Preferably the emulsion is formed in an insulated vessel such that the polymerisation or curing is performed under adiabatic conditions. The aqueous phase acts as a heat sink to prevent an excessive temperature rise during the reaction. On a commercial scale it is convenient to pump the polyester/styrene/diacyl peroxide solution into an insulated vessel containing a solution of colloid stabilisers in water. This produces droplets of oil phase in water.

The droplets are initially large, but agitation, such as by stirring, can reduce the droplet size to the desired level. Very short stirring times and low surfactant levels will allow the formation of large droplets which can then be initiated rapidly. Average granule diameters (ie. largest diameter) of up to 600 μm are achievable, but more typically average granule diameters of 300 μm or less are produced. For example, average granule diameters ranging from 10 μm to 300 μm can be readily attained.

Due to the efficiency of monomer conversion, the initiating system of the invention is particularly well suited for use in the preparation of large granules (ie greater than about 200 μm).

After the desired droplet size is achieved it is necessary to promote the polymerisation reaction. This will typically be achieved by introducing the aromatic amine to the reaction vessel. Most of the aromatic amines useful in the present invention are solids. This is in contrast with DEA which is a liquid. Accordingly it is convenient to dissolve the aromatic amine in a paint compatible solvent prior to its addition to the oil-in-water emulsion. Preferably, the paint compatible solvent is a water miscible solvent such as an alcohol, for example ethanol, ethylene glycol or propylene glycol. Most preferably the solvent is propylene glycol, although the particular solvent used will depend on the solubility characteristics of the aromatic amine and the particular paint product to which the granules are to be subsequently added.

It has been found that some aromatic amines that may be used in accordance with the invention can act as granule coalescents. Accordingly, it is desirable to add the amines in such a way as to avoid pockets of the amine forming in the oil-in-water emulsion. This can be achieved by adding the amine as a relatively dilute solution in the selected solvent. Preferably the concentration of the amine in the solvent is less than 15%, more preferably below 10% and most preferably between 5% and 10% by weight.

It is also preferred that the amine solution is added to the oil-in-water emulsion as a spray or as a series of thin streams, such as through a spray nozzle, into regions of high turbulence or movement. It is also preferred that the rate of stirring of the oil-in-water emulsion is increased during the addition of the amine. Since stirring decreases the droplet size it is important to find the correct balance between minimising droplet size reduction and maximising distribution of the amine.

In order to maintain stability of the emulsion during the polymerisation exotherm, it is preferred that stirring ceases after dispersion of the amine in the emulsion. Following the peak exotherm, i.e. when there is no further temperature rise, stirring may be restarted. This can be important to prevent settlement of the granules.

Settlement of the granules can be a major processing issue in the polymerisation process. Granules made using the process of the invention may or may not be stirred during the polymerisation stage, but some stirring is generally maintained to prevent any risk of settlement of the newly formed granules. However, stirring of the reaction mixture is best carried out when the polymerisation is almost complete and the granules have developed a degree of hardness, otherwise stirring may change the size and shape of the resultant granules. Increasing the viscosity of the granule slurry after polymerisation can prevent settlement of the granules during longer term storage.

Where a large granule size is being targeted, for example above about 200 µm, and the granules are also pigmented, then the degree of granule settlement can be significant. In this case, the granules can begin to settle well before they are sufficiently hard to restart stirring. Under these conditions, the efficiency of the initiating system is important. Advantageously, the initiating system in accordance with the invention is sufficiently reactive at the temperature of granule formation for the polymerisation reaction to begin immediately and proceed rapidly to completion. The initiating system is therefore particularly well suited for use in manufacturing large pigmented polyester granules.

Redox "spikes" may be added at chosen times after initiation of the polymerisation if desired. An example of such a spice is ferrous sulphate solution and sodium erythorbate solution.

The redox initiator system according to the present invention may provide a short cure time, with a shorter induction period and a steeper exotherm, than is achieved using DEA. The unsaturated polyester and styrene are typically copolymerised during the course of the polymerisation reaction.

After polymerisation is substantially complete the granule slurry may be transferred to a curing tank where the slurry may be stirred until the reaction is complete. For example in an industrial process this may be done overnight.

The granules may then be sized by passing the slurry through an appropriate filter, such as a vibrating filter, and then, if necessary, a thickener may be added.

The polyester granules prepared according to the process of the present invention have reduced odour and toxicity relative to those produced by conventional processes. Similarly, paints prepared using the polyester granules of the present invention have reduced odour and toxicity. The reduction in odour and toxicity is partly due to the enhanced conversion of the styrene, and partly due to the production of less volatile and less toxic initiator residues. The process avoids the use of DEA, which is toxic and volatile, and can be performed without AIBN. The lower odour and toxicity makes the granules according to the invention, and the paints prepared from them, more pleasant to use, and, by avoiding the use of DEA, there is an improvement in occupational health and safety in the production plants.

Without wishing to be limited by theory, it is believed that the initiating system in accordance with the invention generates a flux of radicals to initiate the polymerisation process. In particular, through use of (di)benzoyl peroxide as an illustrative example only, the mechanism of radical formation and subsequent initiation is believed to involve:

(i) an initial $SN^2$ attack by the amine to cleave the peroxide linkage and expel a benzoate anion (2) (see Scheme below), forming a benzoyloxyammonium cation (1) (Pryor, 1993) which then (ii) undergoes homolysis to an aminium radical cation (3) and benzoyloxy radical (4) (Walling, 1957). The benzoyloxy radical can then initiate polymerisation.

(iii) The aminium radical cation (3) can lose a proton, most likely via abstraction by the benzoate anion (2) to generate an aminoalkyl radical (5) which can also initiate polymerization (Sato, 1969, 1971 & 1975).

Alternative pathways are available for the decomposition or further reaction of the benzoyloxyammonium cation (1), the aminium radical cation (3), and the benzoyloxy (4) and aminoalkyl (5) radicals, and it is the existence of these competing pathways which is responsible for the low initiation efficiencies inherent in polymerizations initiated by amine/peroxide couples (Walling, 1957).

In particular, when all three groups R are alkyl, the benzoyloxyammonium cation (1) decomposes exclusively through non-radical pathways and polymerization does not occur (Bartlett, 1947). The reason for this is that at least one group R must be aryl to provide sufficient activation of the N—O bond in the benzoyloxyammonium cation (1) to permit homolysis to occur at a rate comparable to those of the competing non-radical reactions. Furthermore, the aryl substituent must be one which can achieve the spatial orientation necessary to provide such activation (Huisgen, 1965).

Substituents on the aromatic ring of a dialkyl arylamine, depending on their position and electronic character, affect the rates of steps (I) and (ii) in the manner usually associated with ionic reactions at a-aryl centres. For example, an electron donating methyl group produces a 10-fold rate increase if placed in the para position, and a weaker 6-fold rate increase in the meta position, while an electron withdrawing meta, chloro substituent causes a 3-fold rate decrease. It is expected that other substituents will also behave in this classically predictable fashion: electron donating substituents will accelerate the reaction (relative to hydrogen) while electron withdrawing substituents will retard it, regardless of their position on the ring (ortho, meta, orpara) (Walling, 1957).

The rate effects are most obviously manifest as changes in induction times, and also in the time required to reach the peak exotherm. Thus, on purely practical grounds electron donating substituents are preferred because they lead to shorter curing times whereas electron withdrawing substituents cause longer curing times.

While it may be expected that increased rates of initiation and the consequent higher radical flux might improve conversion, there appears to be no clear correlation between the two. This is most likely because substituents on the aromatic ring may also promote or retard various side reactions of the amine or the aminium radical cation (3) with the initiating and polymerising radicals and thereby counteract the beneficial effect of higher rates of initiator radical generation. These side reactions of (3) may occur at the N-alkyl groups by abstraction of a hydrogen atom leading ultimately to loss of one alkyl group (Walling, 1957: Sato, 1969), at the aromatic ring, leading to the introduction of further substituents (Walling, 1957; Srinivas, 1989), or, in some cases, at the ring substituent itself. Improved conversions are consistently seen in the case of ring-substituted N,N-bis(2-hydroxyethyl) anilines, and this appears to ensue from the N-hydroxyalkyl groups and ring substituents suppressing side reactions. These side reactions terminate chains, divert intermediates, or consume initiating radicals non-productively.

While the reaction scheme proposed above is described in terms of a diaroyl peroxide, a similar reaction scheme is also believed to operate for dialkanoyl peroxides. However, without wishing to be limited by theory, it is believed that the generation of a radical flux via such reaction schemes is dependant on the reactivity of the peroxide with the amine reductant. In particular, it is believed that diaroyl peroxides are capable of generating a higher radical flux, relative to dialkanoyl peroxides, because they are more reactive at a lower reaction temperature.

SCHEME

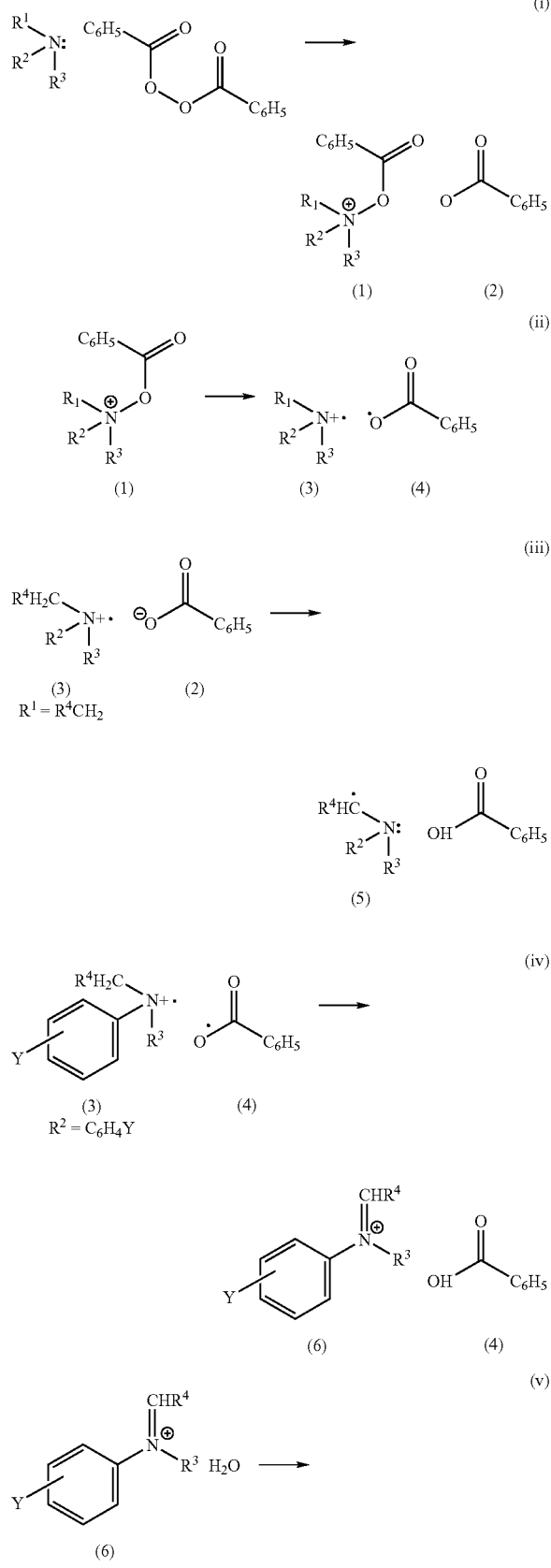

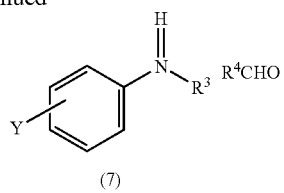

(7)

The comparative reactivity of the peroxides is believed to be particularly important in the overall polymerisation process. By utilising a combination of peroxides which have the ability to generate a high radical flux at different reaction temperatures, the polymerisation process can be designed such that at a relatively low reaction temperature a first peroxide reacts with the aromatic amine to generate an initial high radical flux which initiates the polymerisation reaction. As a result of the exotherm provided by the initial polymerisation reaction, the temperature of the reaction mixture is increased. Through selection of a second peroxide which reacts with the aromatic amine to generate a high radical flux at the increased reaction temperature, a second "burst" of radicals can advantageously be triggered.

The polymerisation process is therefore believed to comprise two stages of high radical flux, each of which occurs at different reaction temperatures. In some respect, the second radical flux provided by the reaction of the second peroxide and the aromatic amine can be considered as an in situ redox "spike". However, unlike conventional redox spiking regimes which are added to the reaction mixture during the course of the polymerisation, the in situ redox spike provided by the present invention is believed to be particularly effective at promoting the conversion of unreacted monomer that remains in the partially formed polyester granules. In particular, by dispersing the combination of peroxides in the monomer droplets, the in situ redox spike is believed to avoid or at least alleviate the difficulty that radicals formed by a conventional spiking regime may have in penetrating into the partially formed granules to complete the conversion of unreacted monomer.

The advantages afforded by the in situ spiking regime surprisingly becomes most apparent when the number of moles of the diacyl peroxide which provides the initial high radical flux at low reaction temperatures is equal to or greater than the number of moles of the diacyl peroxide which provides the second high radical flux at higher reaction temperatures.

Accordingly, the present invention further provides the use of a combination of a first diacyl peroxide and a second diacyl peroxide with an aromatic amine of formula (I):

(I)

where $R^1$ is an optionally substituted $C_1$-$C_{20}$ alkyl group, or —(CHR'CHR'—O)$_n$H
where n is 1 to 10 and each $R^1$ is independently selected from H and $C_1$-$C_3$ alkyl;
$R^2$ is an optionally substituted $C_1$-$C_{20}$ alkyl group, or —(CHR'CHR'—O)$_n$H where n is 1 to 10 and each R' is independently selected from H or $C_1$-$C_3$ alkyl; and
Ar is an optionally substituted aryl group, as a redox initiating system in a process for the manufacture of solid polyester granules by suspension polymerisation, wherein the mole ratio of the first peroxide to the second peroxide is equal to or greater than 1:1, wherein the first and second peroxides are each capable of reacting with the amine to generate a radical flux, and wherein at the commencement of the polymerisation the radical flux generated by the first peroxide is greater than any radical flux generated by the second peroxide.

Preferably one or both of $R^1$ and $R^2$ are $C_1$-$C_{20}$ alkyl substituted with one or more hydroxy groups.

The present invention still further provides a process for the preparation of solid polyester granules comprising:
(i) preparing a solution of unsaturated polyester, a first diacyl peroxide and a second diacyl peroxide in styrene, wherein the mole ratio of the first peroxide to the second peroxide is equal to or greater than 1:1,
(ii) emulsifying said solution in water to provide a stabilised oil-in-water emulsion,
(iii) adding to said emulsion an aromatic amine of formula (I):

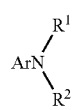

where $R^1$ is an optionally substituted $C_1$-$C_{20}$ alkyl group, or —(CHR'CHR'—O)$_n$H where n is 1 to 10 and each $R^1$ is independently selected from H and $C_1$-$C_3$ alkyl;
$R^2$ is an optionally substituted $C_1$-$C_{20}$ alkyl group, or —(CHR'CHR'—O)$_n$H where n is 1 to 10 and each R' is independently selected from H or $C_1$-$C_3$ alkyl; and
Ar is an optionally substituted aryl group,
such that reaction of the aromatic amine of formula (I) with each of the first and second diacyl peroxides generates a radical flux capable of initiating polymerisation of the unsaturated polyester and the styrene, and wherein at the commencement of the polymerisation the radical flux generated by the first peroxide is greater than any radical flux generated by the second peroxide.

Preferably one or both of $R^1$ and $R^2$ are $C_1$-$C_{20}$ alkyl substituted with one or more hydroxy groups.

As used herein, the term "radical flux" is intended to denote a flow of radicals generated through the reaction of the aromatic amine and a particular peroxide.

In accordance with the invention, the combination of diacyl peroxides used can be classified in terms of their ability to react with the aromatic amine and generate a higher radical flux relative to each other at different stages during the polymerisation reaction. In this case, the first diacyl peroxide is preferably chosen such that its molecular structure facilitates the generation of a higher radical flux at the commencement of the polymerisation. The commencement of the polymerisation reaction will preferably occur at temperatures which are typically 30° C. to 60° C., more preferably 35° C. to 50° C. When pigment is present, the preferred temperature range is 40° C. to 55° C., most preferably in the range of 45° C. to 50° C. Within these temperature ranges, polymerisation is therefore initiated and the polyester granules begin to form.

As a result of the exotherm that accompanies the initial polymerisation promoted by the first peroxide, the temperature of the reaction mixture will increase.

Importantly the second diacyl peroxide is chosen such that its molecular structure retards the generation of a high radical flux, relative to the first diacyl peroxide, at temperatures at which polymerisation is commenced, yet facilitates the generation of a high radical flux at a later stage in the reaction when higher temperatures are attained. Typically, the second diacyl peroxide will be capable of generating a high radical flux within the increased temperature range of the reaction mixture provided by the exotherm which accompanies the initial polymerisation. Preferably, the second diacyl peroxide generates a high radical flux at the peak exotherm temperature of the reaction mixture which results from the initial polymerisation. Typically, the second diacyl peroxide should be capable of generating a high flux of radicals at temperatures no lower than 60° C., preferably no lower than 65° C., most preferably no lower than 70° C.

The second diacyl peroxide will preferably have properties such that it can be dissolved and dispersed within the monomer solution together with the first diacyl peroxide.

In selecting suitable first and second diacyl peroxides for use in accordance with the invention, it is important that the selection be made having regard to the relative ability for each peroxide to react at a different stage in the polymerisation reaction with the aromatic amine and generate a radical flux. As discussed above, the diacyl peroxides should be selected such that the first peroxide is capable of generating a higher radical flux relative to the second peroxide at a lower reaction temperature and hence earlier stage in the reaction process.

With the above selection criteria in mind, examples of diacyl peroxides that have an appropriate molecular structure to function as the first diacyl peroxide may include those peroxides of formula (II). A preferred first diacyl peroxide is (di)benzoyl peroxide.

With the above selection criteria in mind, examples of diacyl peroxides which have an appropriate molecular structure to function as the second diacyl peroxide include those of formula (III). A preferred second diacyl peroxide is (di)lauroyl peroxide.

Generally, the amount of the first diacyl peroxide used will be sufficient to drive the temperature of the reaction mixture to a temperature at which the second diacyl peroxide can generate a high radical flux.

Preferably, the gap between the temperatures at which the first and second diacyl peroxides generate their respective high radical flux ranges from 5° C. to 40° C., more preferably from 15° C. to 30° C., most preferably from 20° C. to 25° C.

Use of the initiating system in accordance with the invention advantageously enables polyester granules to be manufactured in the form of a slurry which can be directly blended with a binder and generally one or more other conventional paint additives to afford a paint product. Examples of conventional paint additives or components include, but are not limited to, thickeners, antifungal agents, UV absorbers, extenders, pigments etc.

Due to the efficiency of monomer conversion, the initiating system in accordance with the invention is particularly suited for use in preparing polyester granules used in specialised paint applications where the paint is formulated so that the granules protrude from the surface an applied paint film. To achieve this "protruding" effect, the paint may be formulated such that the average diameter of the granules is greater than the thickness of the applied paint film. Alternatively, the paint could be formulated such that during drying of a paint film the granules present themselves at the surface of the film where the liquid portion of the paint can drain from the granules and allow them to protrude well clear of the surface of the resulting film. For example, the rheological properties and additive composition of the paint may be tailored to facilitate protrusion of the granules.

Preferably, the average diameter of the granules is at least twice, and up to ten times, the thickness of the paint film. For avoidance of any doubt, reference to the "thickness of the paint film" used herein is intended to be the thickness of a single coat of paint rather than the collective thickness of two or more overlapping coats of paint. Generally, the granules will be of a size similar to the granule diameters defined above.

Paint compositions formulated for decorative application by either tradesmen or consumers are generally marketed as having a practical opacity when applied at a spreading rate of 16 square metres per litre of applied wet paint material. The expression "practical opacity" is generally taken in the art to mean a situation where a selected paint colour has been formulated to completely obscure the colour of an underlying substrate in two coats. Given that water-based paints are typically formulated to contain between 35-40 percent by volume of solid non-volatile material, they will generally deliver a film thickness of about 25 µm of dry paint per applied coat. Hence, in two overlapping coats a painter will apply about 50 µm of dry paint to a substrate being painted.

It will be appreciated that there is considerable scope for variation in the nature of the paint formulation being applied or in the techniques used to apply any material whereby more than 50 µm of dry material will be delivered in two coats. Under or overspreading of the wet paint by the applicator will result in an under delivery or an over delivery of the final amount of dry material. Variation in this way will have considerable implications for the quality of the applied coating. Under spreading will deliver more material with the risk of causing film defects such as excessive flow and sagging of the film on vertical surfaces. On the other hand, over spreading runs the risk of not obscuring an underlying colour with the result that an additional coat will be required.

Paint compositions of the invention are preferably formulated using low levels of external pigmentation (ie. generally less than abut 5 wt % of pigment). Generally, the external pigmentation is provided in the form of a universal tinter. Universal tinters have approximately 60 wt % of pigment, and have been effectively used in amounts of less than about 56 ml per litre of paint product. High levels of external pigmentation can tend to mask the differential colour afforded by the granules. Where the granules are at the upper end of the preferred size range (ie about 500 µm), they are ideally suited to thick film applications where the paint is applied at spreading rates well below conventional paints. In this case, spreading rates of about below 10 square metres per litre will generally be required to achieve practical opacity.

When the paint compositions are formulated with granules at the upper end of the preferred size range, it is preferred that they are applied using specialised roller applicators designed for textured coatings. Conventional roller applicators will have a tendency to apply too little material and to push the granules along the flow lines of the coating giving unsightly flow defects.

In some cases, it may be desirable to formulate the paint with a range of differently sized granules. For example, the total weight percent of granules in the paint composition may comprise an equal weight percent of small (about $\leq 50$ µm), medium (about $>50 \leq 200$ µm), and large (about $>200$ µm) granules.

Where the granules are pigmented and the background of the film is pigmented in a contrasting colour, it is possible to provide paint films with novel differential colour effects produced by differences in pigmentation in the granulated and non-granulated areas of the film. Such differential colour effects are typically more pronounced when the average diameter of the granules is of the order of 100-200 µm. Granules having an average diameter above about 200-300 µm can contribute more dramatically to the surface texture as well as the differential colour effect.

In white and light tint paints, titanium dioxide containing solid granules are used in conjunction with external titanium dioxide to obtain the required opacity and tint strength. In dark or coloured tint bases, unpigmented granules are generally used. For these paints, opacity and tint strength are obtained from external pigmentation.

The water-based polyester granule slurry afforded by the process of the invention can be conveniently combined with a water-based binder to provide for a water-based paint.

The invention therefore also provides a water-based decorative paint composition comprising binder and polyester granules prepared in accordance with the invention, wherein the paint is formulated so that the granules protrude from the surface of an applied paint film.

The invention further provides a method of preparing a water-based decorative paint comprising combining binder and polyester granules prepared in accordance with the invention, wherein the paint is formulated so that the granules protrude from the surface of an applied paint film.

The invention also provides a water-based decorative paint film comprising polyester granules prepared in accordance with the invention, wherein the granules protrude from the surface of the paint film.

The polyester granules can also advantageously be prepared to exhibit different colours through incorporation of different coloured pigments. It has been found that mixtures of different coloured granules can be used in paint formulations to provide for films that exhibit an unusual speckled appearance. Such speckled paints containing different coloured granules are believed to be novel and represent a further aspect of the invention.

Accordingly, the invention further provides a water-based decorative paint composition comprising binder and pigmented polyester granules, wherein the pigmented polyester granules comprise two or more differently coloured pigmented polyester granules, and wherein the paint is formulated so that the granules protrude from the surface of an applied paint film.

The invention still further provides a method of preparing a water-based decorative paint comprising combining binder and pigmented polyester granules, wherein the pigmented polyester granules comprise two or more differently coloured pigmented polyester granules, and wherein the paint is formulated so that the granules protrude from the surface of an applied paint film.

The invention also provides a water-based decorative paint film comprising pigmented polyester granules, wherein the pigmented polyester granules comprise two or more differently coloured pigmented polyester granules, and wherein the granules protrude from the surface of the paint film.

By the expression "pigmented polyester granules" is meant polyester granules that contain a pigment material dispersed throughout the polyester matrix.

Importantly, the pigmented polyester granules used in speckled paint applications comprise two or more "differently coloured" pigmented polyester granules. Those skilled in the art will appreciate the difficulties associated with defining pigmentation in terms of the way in which it delivers colour to individual granules and then how the colour effect of these granules, with or without other external pigmentation, are perceived in the final paint film.

From a practical point of view, the expression "differently coloured" pigmented polyester granules used herein refers to two or more pigmented granules which, as a collective, impart to the paint film a different visual effect compared to an equivalent paint film in which the granules were only the colour of one of the two or more granules.

For example, despite that dark orange and red pigmented granules may technically be considered to be "differently coloured", if a 50:50 wt % blend of these granules in a paint film afforded no discernible visual difference from a film comprising the same mass of only the dark orange or red granules, then these two granules would not be considered "differently coloured" for the purpose of the invention. In order to provide a speckled effect, the colour of the granules should be selected so that they can be perceived to afford separate features in the overall final film. Granules selected to afford the speckled effect therefore preferably have a strong contrast in colour or hue, for example black and white.

From a more technical approach, a principal matter of colour determination in the paint industry is how close a sample colour is to a target colour. A colour difference formula called CIELAB, published by CIE in 1976, is one mathematical treatment available for quantifying the colour difference between two specimens. By this formula, a delta E value is the principal parameter used for determining colour differences, whereby, in general, the lower the delta E value is, the closer the sample colour is to its target. Those skilled in the art will appreciate that defining colour difference in terms of the delta E value is a simplified approach, and that there are a great many ways in which a colour can be perceived as being different even though the delta E measurement would indicate that they are quite close. Nevertheless, for the purpose of the invention, delta E values may serve as guide on whether the pigmented granules are differently coloured. In this case, it is preferred that the delta E value is at least 3, more preferably at least 5.

In order to enhance contrast between the two or more differently coloured pigmented polyester granules, the polyester granules will generally be coloured with different pigment materials.

The pigmented polyester granules used in the specialised speckled paint applications will generally be of a size similar to the granule diameters defined above, and may be prepared by any suitable means. However, given that conventional techniques for making such granules can be prone to incomplete monomer conversion during the polymerisation, it is preferred that the highly efficient redox initiating system of the invention is used to prepare the pigmented granules.

The speckled paint compositions have been found to be particularly effective at affording paint films, as applied on walls, paving and bench tops etc, that simulate the appearance of natural stone, such as granite.

By the expression "decorative paint" is meant those paints which are typically applied to architectural features and the like, and are most often used in households for application to both interior and exterior surfaces. Decorative paints are generally used to provide both aesthetic appeal and/or a degree of protection to a substrate.

The aforementioned water-based decorative paints are generally also formulated to contain one or more conventional paint additives.

Those skilled in the art will appreciate that water-based paints are generally formulated with a binder. Such binders are typically in the form of an aqueous dispersion of polymer particles, and are prepared by emulsion polymerisation techniques. A diverse array of well known binders can advantageously be used in formulating the water-based decorative paints in accordance with the invention.

The invention will now be described with reference to the following examples which illustrate some preferred embodiments of the present invention, together with some comparative examples. However it is to be understood that the particularity of the following description of the invention is not to supersede the generality of the invention hereinbefore described.

EXAMPLES

Comparative Example 1

Formulation

A 1 kg sample of pigmented solid granule slurry was prepared by using the process outlined below.

| Stage | Material | Wt. (g) |
|---|---|---|
| A | Unsaturated polyester solution[1] (65% NV in styrene monomer) | 55.48 |
|   | Styrene | 19.52 |
|   | Titanium dioxide (Tiona RCL575, ex Millenium Inorganic Chemicals) | 153.92 |
|   | Unsaturated polyester solution | 48.13 |
| B | Styrene | 17.02 |
|   | Benzoyl peroixde (75 wt. % paste in water). | 15.00 |
|   | Unsaturated polyester solution | 118.21 |
|   | Aerosol MA-80[2] | 1.25 |
| C | 1.5% hydroxyethyl cellulose solution[3] | 113.32 |
|   | 7.5% polyvinylalcohol solution[4] | 35.05 |
|   | Water | 49.17 |
| D | hot water | 230.87 |
| E | 25% Dihyto[5] | 8.11 |
|   | Water | 11.55 |
| F | Antifoam | 0.26 |
| G | Preservative | 0.70 |
| H | Propylene glycol | 23.14 |
|   | Kelzan S[6] | 3.85 |
| I | Propylene glycol | 19.04 |
| J | Sodium carbonate | 8.80 |
|   | Water | 40.00 |
| K | Water | 28.00 |
|   |   | 1000.39 |

Notes:
[1] Terpolymer of propylene glycol/maleic anhydride/phthalic anhydride.
[2] Sodium dihexyl sulfosuccinate surfactant (ex Cytec).
[3] Natrosol 250HR (ex Aqualon)
[4] Solution of 88% hydrolysed polyvinyl alcohol (eg Poval 224 ex Kurary or Airvol 540 ex Air Products).
[5] 25% bis(hydroxyethyl)-p-toluidine in propylene glycol.
[6] Kelzan S (ex Kelco USA).

Procedure

1. The titanium dioxide was dispersed by high speed mixing in the polyester/styrene blend (Stage A), in a 250 ml open can.
2. Stage B was prepared by gently warming the diacyl peroxide(s) in styrene followed by letting down with polyester and finally the Aerosol MA-80 solution. This procedure was carried out in a 500 ml open can.
3. Stage A was added to Stage B with gentle stirring.
4. Stage C was prepared by adding the ingredients in the order shown to a separate one litre can with vigorous stirring. The temperature is adjusted into the desired range using hot water, Stage D. In this example the initiation temperature chosen was 50° C.
5. The amine solution Stage E was prepared separately in a small container.
6. The combined A+B stages were then added to Stage C under stirring to form an oil in water emulsion. Stirring was continued at high speed until the desired emulsion droplet size was achieved (topsize 100 μm, 4 minutes of stirring at 600 rpm.) The stirring speed was then decreased.
7. Once the emulsion droplet size is reached the Stage E amine solution was added in a thin stream to commence the polymerisation. The can was surrounded by a thermal insulant to minimise heat losses. The exotherm was extremely rapid in rising to a peak temperature of over 90° C. within two minutes
8. The granule sample was left to cure overnight.
9. Once cured, the granules were filtered through 210 μm silk and adjusted with individually premixed Stages F-K to produce final useable granule slurry.

A sample of the granule slurry produced by the method of this Example was subjected to analysis for residual styrene monomer (see Table 1, Entry 7).

Comparative Example 2

The procedure of Comparative Example 1 was repeated except for the benzoyl peroxide component in Stage B was replaced by dilauryl peroxide. Granule formation process required slightly longer times to achieve the desired 100 μm topsize for the emulsion droplets, 600 rpm for 5 minutes followed by a period at 710 rpm for a further 4.5 minutes. It will be appreciated by those skilled in the art that the precise stirring times required are a feature of particular equipment characteristics. The key requirement to be achieved is attainment of the desired topsize for emulsion droplets prior to initiation of the polymerisation.

The initial onset of the polymerisation following the addition of the Stage E amine solution was delayed. Little if any discernible temperature increase was evident for almost 3 minutes after initiation. The temperature then rose slowly until a temperature of 55° C. was reached where upon the temperature appeared to increase more rapidly. The peak exotherm of over 90° C. was reached 9 minutes after initiation.

A sample of the granule slurry produced by the method of this Example was subjected to analysis for residual styrene monomer (see Table 1, Entry 1).

Example 1

The procedure of Comparative Example 1 was repeated except for the replacement of the benzoyl peroxide component in Stage B by a combination of benzoyl peroxide paste and dilauroyl peroxide using the quantities shown in Table 1. An initiating temperature of approximately 55° C. was chosen.

Samples of the granule slurries produced by the method of this Example were subjected to analysis for residual styrene monomer, the levels of which are given in Table 1.

General procedure for residual styrene analysis of granule slurry:

A slurry sample was mixed at a 2:1 weight ratio with an aqueous solution of internal standard, before sealing a drop of this mixture in a crimp capped septum vial. The sealed vial was then held at 130° C. for 1 hour to exhaustively evaporate the volatile components into the headspace of the vial. The headspace of the vial was then sampled by an automated headspace sampler. The volatile components were analysed using capillary gas chromatography with Helium carrier gas and Mass Selective Detection to monitor only three ions specific to styrene to achieve maximum sensitivity. Three styrene ions were monitored during data acquisition, one of which was used for quantification, the other two for quality control.

TABLE 1

Comparison of residual free styrene levels for granule slurries made with varying weight ratios of peroxides initiated at 55° C.

| Entry | Wt. (g) of benzoyl peroxide paste (75% in water) | Wt. (g) of dilauroyl peroxide | Wt. (g) of 25% Dihyto[3] solution | Free styrene level (ppm) |
|---|---|---|---|---|
| 1[1] | 0.00 | 15.00 | 8.11 | 1860 |
| 2 | 8.00 | 7.00 | 8.11 | 270 |
| 3 | 10.00 | 5.00 | 5.39 | 610 |
| 4 | 10.00 | 5.00 | 8.11 | 120 |
| 5 | 10.00 | 7.00 | 9.20 | 30 |
| 6 | 12.00 | 3.00 | 8.11 | 690 |
| 7[2] | 15.00 | 0.00 | 8.11 | 1190 |

Notes:
[1]Data from Comparative Example 2.
[2]Data from Comparative Example 1.
[3]N,N-bis(2-hydroxyethyl)-p-toluidine Example 2

The procedure of Comparative Example 1 was repeated except for the replacement of the benzoyl peroxide component in Stage B by a combination of benzoyl peroxide paste and dilauroyl peroxide using the quantities shown in Table 2, and using an initiation temperature of approximately 45° C.

Samples of the granule slurries produced by the method of this Example were subjected to analysis for residual styrene monomer, the levels of which are given in Table 2.

TABLE 2

Comparison of residual free styrene levels for granule slurries made with varying weight ratios of peroxides initiated at 45° C.

| Entry | Wt. (g) of benzoyl peroxide paste (75% in water) | Wt. (g) of dilauroyl peroxide | Wt. (g) of 25% Dihyto[1] solution | Free styrene level (ppm) |
|---|---|---|---|---|
| 1 | 7.00 | 8.00 | 8.11 | 960 |
| 2 | 8.00 | 7.00 | 8.11 | 620 |
| 3 | 10.00 | 5.00 | 8.11 | 170 |
| 4 | 11.00 | 4.00 | 8.11 | 200 |

Notes:
[1]N,N-bis(2-hydroxyethyl)-p-toluidine

Example 3

The procedure of Comparative Example 1 was repeated except for the replacement of the Dihyto solution in Stage E by a 25% w/w solution of an alternative tertiary aromatic amine in propylene glycol.

Samples of the granule slurries produced by the method of this Example were subjected to analysis for residual styrene monomer, the levels of which are given in Table 3.

TABLE 3

Comparison of residual free styrene levels for granule slurries made using alternative tertiary aromatic amines as initiators at 45° C..

| Entry | Wt. (g) of benzoyl peroxide paste (75% in water) | Wt. (g) of dilauroyl peroxide | Tertiary aromatic amine | Wt. (g) of 25% solution of tertiary aromatic amine[1] | Free styrene level (ppm) |
|---|---|---|---|---|---|
| 1 | 10.00 | 5.00 | Dihyto[2] | 8.11 | 170 |
| 2 | 10.00 | 5.00 | m-HET[3] | 8.11 | 350 |
| 3 | 10.00 | 5.00 | HEA[4] | 7.53 | 440 |
| 4[6] | 10.00 | 0.00 | Dihyto[2] | 5.39 | 7790 |
| 5[6] | 10.00 | 0.00 | DMA[5] | 3.34 | 8400 |
| 6 | 10.00 | 5.00 | DMA[5] | 5.15 | 2550 |

Notes:
[1] The molar ratio of amine to total peroxides is kept constant within this series. All amine solutions were in propylene glycol.
[2] N,N-bis(2-hydroxyethyl)-p-toluidine
[3] N,N-bis(2-hydroxyethyl)-m-toluidine
[4] N,N-bis(2-hydroxyethyl)aniline
[5] N,N-dimethylaniline
[6] Comparative example

Example 4

A sample of granules was produced using a black pigment (Bayferrox Black 318 ex BASF). The target particle size for the granules was 100 μm. The procedure used was as outlined in Comparative Example 1.

| Stage | Material* | Wt (g) |
|---|---|---|
| A | Polyester | 55.48 |
|  | Styrene | 19.52 |
|  | Aerosol | 1.25 |
|  | Bayferrox Black 318 | 15.39 |
|  | Polyester | 48.13 |
| B | Styrene | 17.02 |
|  | Benzoyl peroxide | 10.00 |
|  | Lauroyl peroxide | 4.60 |
|  | Polyester | 118.21 |
|  | Aerosol | 0.00 |
| C | 1.5% Natrosol | 113.32 |
|  | 7.5% PVA | 35.05 |
|  | water | 49.17 |
| D | hot water | 219.30 |
| E | 25% Dihyto | 8.31 |
|  | Water | 11.55 |
| F | Antifoam | 0.26 |
|  | Water | 33.46 |
|  | Water | 9.36 |
| G | Preservative | 0.70 |
|  | Water | 15.40 |
| H | Propylene glycol | 1.54 |
|  | Water | 23.14 |
|  | Kelzan | 3.85 |
|  | Water | 17.50 |
| J | Sodium carbonate | 8.80 |
|  | Water | 20.80 |
| K | Water | 0.36 |
|  |  | 861.47 |

*All raw materials except for the pigment were as specified in Comparative Example 1.

The target bead size of 100 μm was achieved by stirring during the bead formation stage for 4 minutes at 600 rpm. Observation under an optical microscope confirmed that the black pigment was fully enclosed within the bead droplets.

The polymerisation exotherm was slower than for Example 1 but still efficient very efficient rising to a peak temperature of 78° C. over 15 minutes.

Analysis of residual styrene content following polymerisation gave a free styrene content of 120 ppm.

Example 5

A 1 kg sample of 300 μm black granules was prepared according to the formulation outlined in Example 4. In order to achieve the required granule size it was necessary to carry out the granule formation step under more gentle conditions. The granulating stage was carried out at a slower stirring speed of 320 rpm but for 60 seconds only.

The curing reaction proceeded rapidly rising to a peak exotherm of 98° C. over 15 minutes The residual styrene content following polymerisation was measured at 350 ppm.

Example 6

A 1 kg sample of white pigmented solid beads was produced according to the procedure of Example 1, Entry 5. The target bead size of 200 μm was achieved by carrying out the bead formation stage at 320 rpm for 90 seconds.

The polymerisation proceeded rapidly rising to a peak exotherm of 81 μC over 12 minutes.

The residual styrene content following polymerisation was measured at 260 ppm.

Example 7

A 1 kg sample of 40 μm white pigmented beads was produced according to the procedure of Example 1, Entry 5. The only change introduced was to increase the Stage B Aerosol MA80 level to 1.56. An increase in surfactant level was necessary to achieve the target bead size of 40 μm and the bead formation stage was carried out at 600 rpm for 15 minutes.

The residual styrene content following polymerisation was measured at 130 ppm.

Example 8

A granite effect paint was prepared by simply blending samples of pigmented granules prepared in Examples 4, 6 and 7 so as to achieve the following blend ratio.

| Paint Composition |  | Pts (Wt) |
|---|---|---|
| Example 4 | 100μ black granules | 20 |
| Example 6 | 200μ white granules | 20 |

| Paint Composition | | Pts (Wt) |
|---|---|---|
| Example 7 | 40μ white granules | 10 |
| | Water-based clear coat* | 50 |

*Dulux Aquatread Clear

The final paint was tinted using approximately 28 ml of tinter based on a pthalocyanine pigment and applied to an unsealed masonry panel using a 12 mm roller to achieve two coats with drying under room temperature conditions. The final film gave an even textured appearance with the mixture of pigmented granules clearly evident to the naked eye.

Example 9

A similar paint to Example 8 was prepared by blending the samples of pigmented granules prepared in Examples 4 to 7.

| Paint Composition | | Pts (Wt) |
|---|---|---|
| Example 5 | 300 μm black granules | 15 |
| Example 4 | 100 μm black granules | 10 |
| Example 6 | 200μ white granules | 15 |
| Example 7 | 40μ white granules | 10 |
| | Water-based clear coat* | 50 |

*Dulux Aquatread Clear

The paint was tinted and then applied in a similar manner to Example 8 and the films compared. The higher proportion and size of the black beads was clearly evident in the appearance of the film.

Example 10

An untinted paint was prepared in accordance with the following formulation.

| Paint Composition | | Pts (Wt) |
|---|---|---|
| Example 4 | 300 μm black granules | 20 |
| Example 1, Entry 5 | 100 μm white granules | 20 |
| Example 7 | 40 μm white granules | 10 |
| | Water-based clear coat* | 50 |

*Dulux Aquatread Clear

In this case the appearance of the applied film was such that the large black particles were clearly evident as large flocs against the untinted contrasting matrix.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in any country.

REFERENCES

Bartlett, P. D. & Nozali, K. (1947). The Decomposition of Benzoyl Peroxide in Solvents. II Ethers, Alcohols, Phenols and Amines. J. Amer. Chem. Soc. 69, pp 2299-2303.

Huisgen, R. & Kolbeck, W. (1965). N-Acyloxy-Ammonium-Salze. Tetrahedron Letters no 12, pp 783-787.

Pryor, W. A. & Hendrickson, W. H. (1993). The Mechanism of Radical Production from the Reaction of N,N-Dimethylaniline with Benzoyl Peroxide. Tetrahedron Letters 24, no 14, pp 1459-1462.

Sato, T. & Otsu, T. (1969). Vinyl Polymerisation Initiated with Dimethylaniline N-Oxide and Metal Salts. Makromol. Chem. 125, 1-14.

Sato, T., Talkada, M. & Otsu, T. (1971). Vinyl Polymerisation with Dimethylaniline/Cupric Nitrate System. Malcromol. Chem. 148, pp 239-249.

Sato, T., Kita, S. & Otsu, T. (1975). A Study on Initiation of Vinyl Polymerisation with Diacyl Peroxide-Tertiary Amine Systems by Spin Trapping Technique. Makromol. Chem. 176, pp 561-571.

Srinivas, S. & Taylor, K. G. (1989). Amine Induced Reactions of Diacyl Peroxides. J. Org. Chem. 55, pp 1779-1786.

Walling, C. (1957). Free Radicals in Solution, pp 590-595. New York: John Wiley & Sons Inc.

The invention claimed is:

1. A process for the preparation of solid polyester granules comprising:
   (i) preparing a solution of unsaturated polyester and a combination of diacyl peroxides in styrene, wherein the combination of diacyl peroxides comprises diaroyl peroxide and dialkanoyl peroxide having a diaroyl peroxide to dialkanoyi peroxide mole ratio that ranges from 1:1 to 10:1,
   (ii) emulsifying said solution in water to provide a stabilised oil-in-water emulsion,
   (iii) adding to said emulsion an aromatic amine of formula (I):

where $R^1$ is an optionally substituted $C_1$-$C_{20}$ alkyl group, or —(CHR'CHR'—O)$_n$H, where n is 1 to 10 and each R' is independently selected from H and $C_1$-$C_3$ alkyl;

$R^2$ is an optionally substituted $C_1$-$C_{20}$ alkyl group, or —(CHR'CHR'—O)$_n$H, where n is 1 to 10 and each R' is independently selected from H and $C_1$-$C_3$ alkyl; and Ar is an optionally substituted aryl group, such that reaction of said aromatic amine of formula (I) with each of the diaroyl and dialkanoyl peroxides generates a radical flux capable of initiating polymerisation of the unsaturated polyester and the styrene, wherein a slurry of polyester granules prepared by the process has a residual free styrene level of less than 1000 ppm.

2. The process according to claim 1, wherein one or both of $R^1$ and $R^2$ are hydroxy ethyl groups.

3. The process according to claim 1, wherein the diaroyl peroxide is selected front compounds of formula (II):

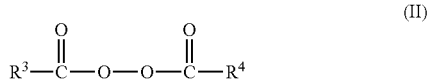

(II)

where $R^3$ and $R^4$ are independently selected from optionally substituted aryl.

4. The process according to claim 1, wherein the diaroyl peroxide is selected from dibenzoyl peroxide and 2,4-dichlorohenzoyi peroxide.

5. The process according to claim 1, wherein the dialkanoyl peroxide is selected from compounds of formula (III):

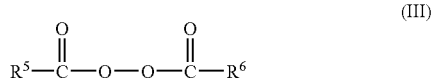

(III)

where $R^5$ and $R^6$ are independently selected from optionally substituted alkyl.

6. The process according to claim 1, wherein the dialkanoyl peroxide is selected from dilauroyl peroxide, diacetyl peroxide, disoccinyl peroxide, di(3,5,5-trimethylhexanoyl) peroxide, and didecanoyl peroxide.

7. The process according to claim 1, wherein the mole ratio of the aromatic amine to the total number of moles of the diaroyl and dialkanol peroxides ranges from 1:2 to 1:8.

8. The process according to claim 1, wherein the aromatic amine is selected from N-ethyl-N-hydroxyethyl aniline, N,N-bis hydroxyethyl aniline, N-ethyl-N-hydroxyethyl-p-toluidine and N,N-bis(2-hydroxyethyl)-p-toluidlile.

9. The process according to claim 1, wherein the unsaturated polyester is a terpolymer of maleic anhydride, phthalic anhydride and propylene glycol.

10. The process according to claim 1, wherein the solid polyester granules have an average diameter of up to 500 μm.

11. The process according to claim 1, wherein the aromatic amine is added to the emulsion as a spray or as a series of thin streams.

\* \* \* \* \*